United States Patent [19]
Suzuki et al.

[11] Patent Number: 5,654,533
[45] Date of Patent: Aug. 5, 1997

[54] APPARATUS AND METHOD FOR READING TWO-DIMENSIONAL SYMBOLS

[75] Inventors: Masashi Suzuki; Mitsuo Uchimura, both of Shizuoka-ken, Japan

[73] Assignee: Kabushiki Kaisha TEC, Shizuoka, Japan

[21] Appl. No.: 503,230

[22] Filed: Jul. 17, 1995

Related U.S. Application Data

[63] Continuation of Ser. No. 121,878, Sep. 17, 1993, abandoned.

[30] Foreign Application Priority Data

| Oct. 26, 1992 | [JP] | Japan | 4-287845 |
| Oct. 27, 1992 | [JP] | Japan | 4-288970 |

[51] Int. Cl.[6] ............................................. G06K 7/10
[52] U.S. Cl. ............................................. 235/455; 235/462
[58] Field of Search ............................. 235/462, 455, 235/456, 472, 454

[56] References Cited

U.S. PATENT DOCUMENTS

| 4,327,378 | 4/1982 | Tanaka et al. | 348/365 |
| 4,453,185 | 6/1984 | Shikano et al. | 348/229 |
| 4,488,679 | 12/1984 | Bockholt et al. | 235/472 |
| 4,516,017 | 5/1985 | Hara et al. | 235/455 X |
| 4,528,444 | 7/1985 | Masahiro et al. | 235/462 |
| 4,562,476 | 12/1985 | Shikano et al. | 348/365 |
| 4,673,804 | 6/1987 | Filauro et al. | 235/462 X |
| 4,737,855 | 4/1988 | Arai et al. | 348/365 |
| 4,843,476 | 6/1989 | Fujioka et al. | 348/365 |
| 4,868,667 | 9/1989 | Tani et al. | 348/296 |
| 4,874,933 | 10/1989 | Sanner | 235/470 |
| 4,924,078 | 5/1990 | Sant'Anselmo et al. | 235/494 |
| 4,972,475 | 11/1990 | Sant'Anselmo | 380/54 |
| 5,036,400 | 7/1991 | Harduki | 348/364 |
| 5,083,209 | 1/1992 | Inoue et al. | 348/296 |

FOREIGN PATENT DOCUMENTS

| 0 385 478 | 9/1990 | European Pat. Off. . | |
| 62-171080 | 7/1987 | Japan . | |
| 0166478 | 7/1987 | Japan | 235/455 |
| 1100684 | 4/1989 | Japan | 382/59 |
| 0244388 | 9/1990 | Japan | 235/455 |
| 4-84378 | 3/1992 | Japan . | |

Primary Examiner—Donald T. Hajec
Assistant Examiner—Jeffrey R. Filipek
Attorney, Agent, or Firm—Oblon, Spivak, McClelland, Maier & Neustadt, P.C.

[57] ABSTRACT

An optical reading apparatus for reading a two-dimensional symbol includes a housing having an opening portion for confronting the symbol, a gripping portion, and a serial I/F for transmitting a two-dimensional code data corresponding to the two-dimensional symbol to an external apparatus. LEDs mounted near the opening portion generate light to illuminate the two-dimensional symbol. A mirror reflects light reflected from the two-dimensional symbol toward the gripping portion. An automatic diaphragm mechanism regulates the light from the mirror. A two-dimensional type CCD generates electrical signals corresponding to the regulated light. Image processing circuits convert the electrical signals to the two-dimensional code data.

27 Claims, 9 Drawing Sheets

APPARATUS AND METHOD FOR READING TWO-DIMENSIONAL SYMBOLS

This application is a continuation of application Ser. No. 08/121,878, filed on Sep. 17, 1993, now abandoned.

BACKROUND OF THE INVENTION

1. Field of the Invention

The present invention relates to optical reading apparatus, and more particularly to optical reading apparatus which can read two-dimensional symbols and a method for reading the same.

2. Description of the Related Art

Figure 1A:
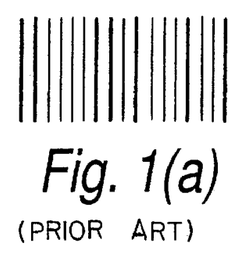
FIGS. 1a, 1b, and 1c show various symbol codes.

An optical reading apparatus is disclosed in U.S. Pat. No. 4,528,445. This optical reading apparatus is used to read a bar code of only one row as a one-dimensional symbol. FIG. 1 shows various symbol codes. FIG. 1 (a) shows a conventional bar code as a one-dimensional symbol. The conventional optical reading apparatus for reading the bar code is explained next. Light generated by a light source in a housing is illuminated on the bar code after being condensed. Reflected light from the bar code is transmitted to a reading sensor through a lens and a diaphragm member so that an image of the bar code is imaged on the reading sensor. Output signals from the reading sensor are decoded.

Figure 1B:
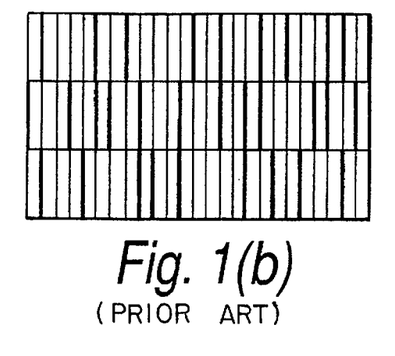
Figure 1C:
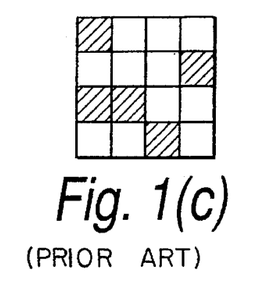

Symbol codes other than the bar code are known too. In order to provide more information in the symbol codes and to allow the symbol code to be smaller or more compactly shaped, several new symbol codes have been adopted. For example, a two-dimensional bar code as shown in FIG. 1 (b) which has two or more rows of bars or a calra code as shown in FIG. 1 (c). These symbol codes are called two-dimensional symbols.

Figure 2:
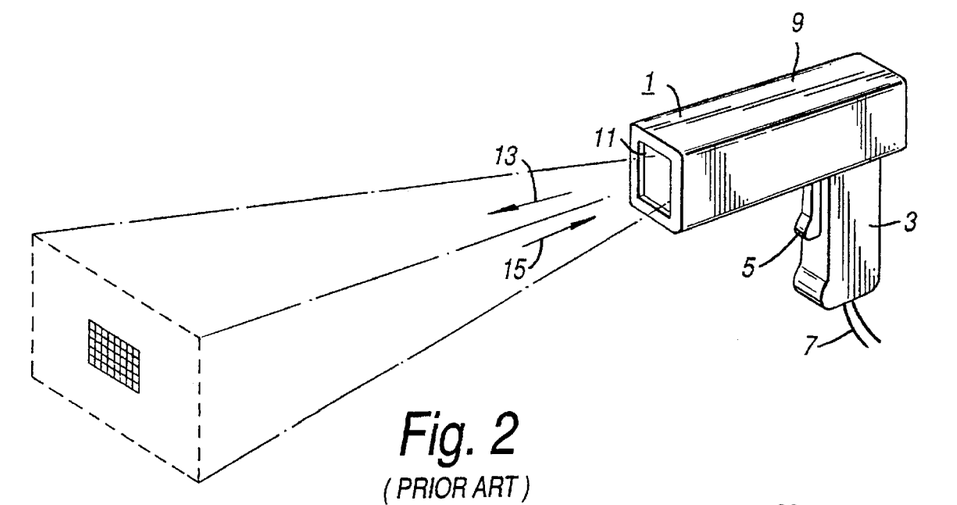
FIG. 2 is a perspective view of a conventional optical reading apparatus.
Figure 3:
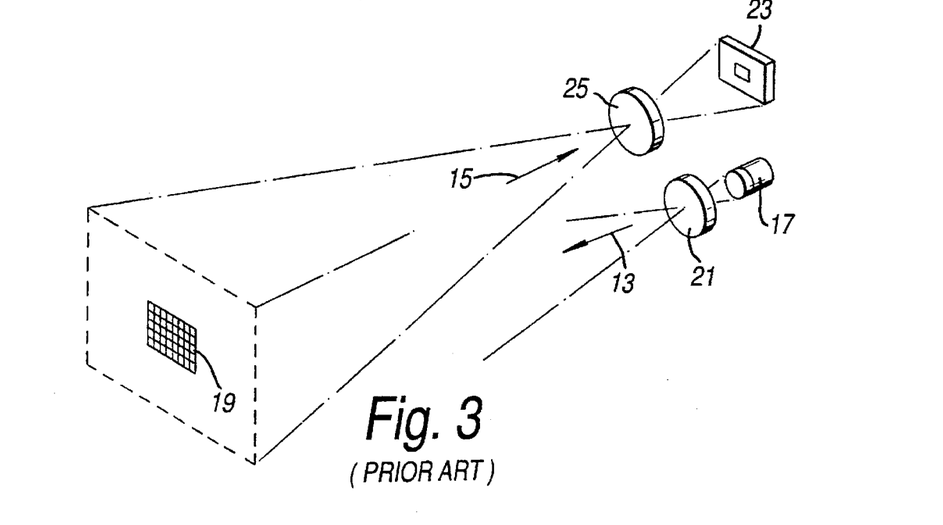
FIG. 3 is an exploded view of the optical reading apparatus shown in FIG. 2.

An optical reading apparatus for reading the two-dimensional symbol is disclosed in European Laid-open Patent Publication No. 0385478 published Sep. 5, 1990, and shown in FIGS. 2 and 3. FIG. 2 is a perspective view of optical reading apparatus disclosed in the European publication. This optical reading apparatus 1 is a gun-shaped device having a pistol-grip type of handle 3, and a movable trigger 5. A detecter circuit or the like is activated by the operater operating the movable trigger 5. The optical reading apparatus 1 usually is connected to a host computer via a wire cable 7. A plastic housing 9 contains a light source, a detecter, optics and a signal processing circuit. A light-transmissive window 11 in the front end of the plastic housing 9 allows the outgoing light beam 13 to exit and the incoming reflected light 15 to enter.

FIG. 3 is an exploded view of the optical reading apparatus shown in FIG. 2. The light beam 13 from the light source 17 is illuminated on a two-dimensionai bar code 19 through a first lens 21. The reflected light 15 from the two-dimensional bar code 19 is transmitted to a light-responsive array 23 through a second lens 25 so that an image of the two-dimensional bar code 19 is imaged on the light-responsive array 23. An output of this light-responsive array 23 is transferred to a memory array (not shown) to provide a binary representation (bit-mapped) of the image of the two-dimensional bar code 19. This bit-mapped representation is decoded.

The above described optical reading apparatus for reading two-dimensional symbol is a pistol type. Therefore, when the operator uses the optical reading apparatus, the accuracy of the reading can depend on the stability of the optical reading apparatus, based on the steadiness with which the user holds the apparatus.

SUMMARY OF THE INVENTION

Accordingly, it is an object of the present invention to provide optical reading apparatus which may solve the above described deficiencies in the related art.

In order to achieve the above object of the present invention, there is provided an optical reading apparatus for reading a two-dimensional symbol, the apparatus including a housing having an opening portion for confronting the two-dimensional symbol and a gripping portion for holding by an operator, the apparatus comprising, means, mounted near the opening portion, for generating light to illuminate the two-dimensional symbol through the opening portion, means for directing the light reflected from the two-dimensional symbol toward the gripping portion, means for regulating the light directed from the directing means to provide regulated light, means, responsive to the regulated light, for generating electrical signals, the generating means including a plurality of photosensitive elements arranged in a two-dimensional form, means for converting the electrical signals into a two-dimensional code data.

Further in accordance with the present invention, there is provided a method for reading a two-dimensional symbol using optical reading apparatus including a housing having an opening portion for confronting the two-dimensional symbol and a gripping portion for holding by an operator, comprising the steps of, generating light to illuminate the two-dimensional symbol through the opening portion, directing light reflected from the two-dimensional symbol toward the gripping portion, regulating the directed light, receiving the regulated light, generating electrical signals in response to the regulated light, converting the electric signals into a two-dimensional code data.

BRIEF DESCRIPTION OF THE DRAWINGS

These and other objects and advantages of the present invention will become more apparent and more readily appreciated from the following detailed description of the presently preferred exemplary embodiments of the invention taken in conjunction with the accompanying drawings wherein:

FIG. 8 (a) is a block diagram of a code image processing circuit of the optical reading apparatus of an embodiment of the present invention;

FIG. 8 (b) is a block diagram of an image signal processing circuit of the optical reading apparatus of an embodiment of the present invention;

DETAILED DESCRIPTION OF THE PREFERRED EMBODIMENTS

Figure 4:
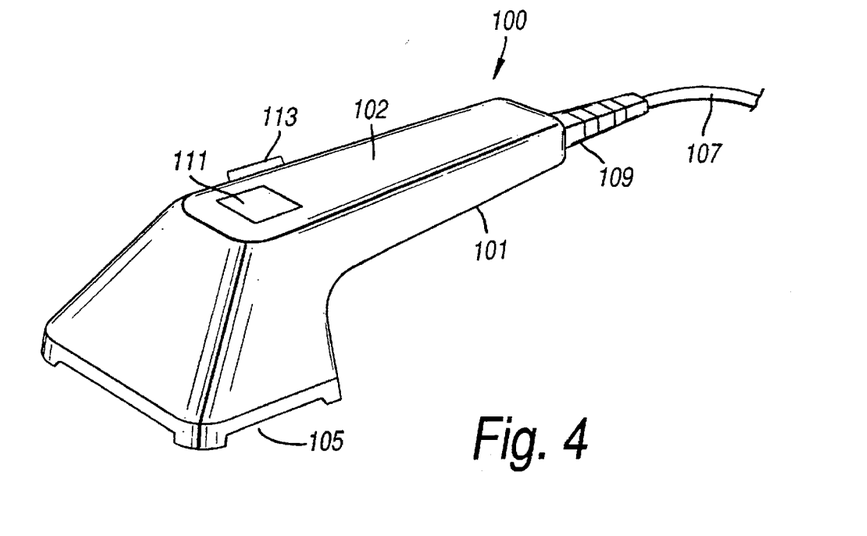
FIG. 4 is a perspective view of an optical reading apparatus of a first embodiment of a present invention.
Figure 5:
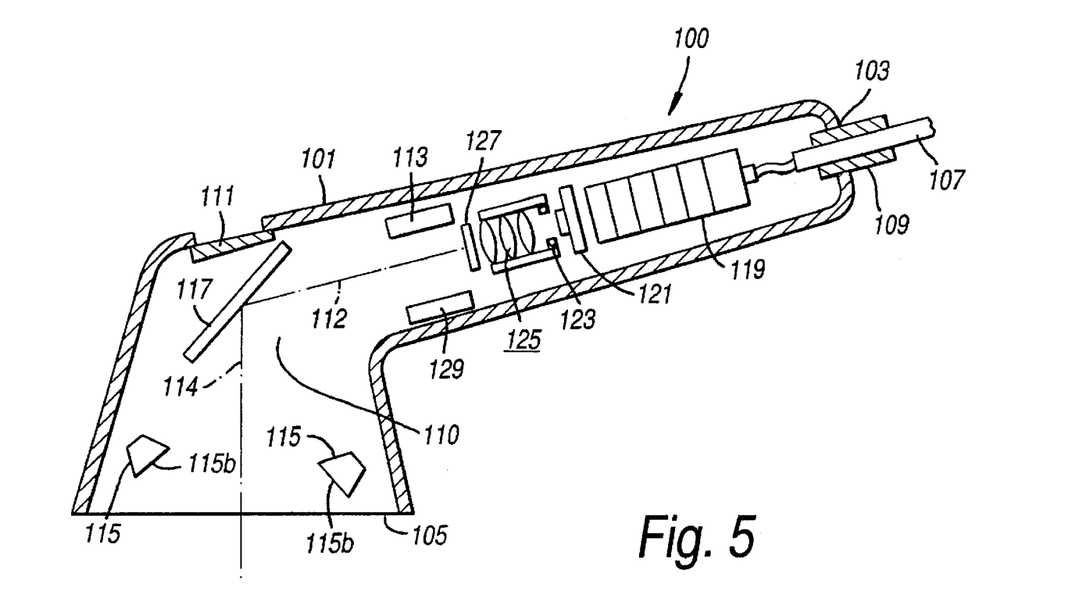
FIG. 5 is a sectional view of the optical reading apparatus of the first embodiment of the present invention.

Preferred embodiments of the present invention will now be described in more detail with reference to the accompanying drawings. A first embodiment of the present invention will now be described with reference to FIGS. 4 to 11. FIG. 4 is a perspective view of an optical reading apparatus of a first embodiment of a present invention. FIG. 5 is a sectional view of the optical reading apparatus of the first embodiment of the present invention. A seamless housing 101 which is made of light-weight materials, for example a plastic or the like, has a hole 103 in an end of the housing 101 and an opening 105 (reading portion) in an other end of the housing 101. The hole 103 is provided to insert a wire cable 107 including a power line and signal lines and the like. The wire cable 107 is fixed by a protection member 109 to the housing 101. This optical reading apparatus 100 has an LCD (Liquid Crystal Display) 111, and a movable switch 113 used to designate the starting of a read operation. The LCD 111 is mounted in the top of the housing 101. The movable switch 113 is mounted in the side of the housing 101. The portion of housing 101 adjacent hole 103 is shaped as a gripping portion 102. An axis 112 of gripping portion 102 forms an angle larger than 90 degrees (for example 110 degrees) with an axis 114 through the side of housing 101 terminating at reading portion 105, when the reading portion 105 is directed at the two-dimensional symbol printed on the surface of the recording media, for example label, gripping portion 102 forms an angle with the surface. As a result, an operator may easily direct the reading portion 105 on to the two-dimensional symbol.

The reading portion 105 side of the housing 101 contains several light sources 115 and a reflecting mirror 117. Each light source 115 consist of an LED (Light Emitting Diode) 115a (FIG. 7) and a diffusion lens 115b made of a plastic to equally diffuse light from the LED. As a result, light from the light sources is equally illuminated on the two-dimensional code. The reflecting mirror 117 is mounted in the bend portion 110 of the housing 101 at a prescribed angle relative to a direction of the reading portion 105. A prism may be thus, as the reflecting mirror.

The hole 103 side of the housing 101 contains a circuit portion 119 connected with the wire cable 107 and a two-dimensional type CCD (Charge Coupled Device) 121. The circuit portion 119 includes an LCD/buzzer control circuit, a main control circuit, a decode circuit, a code image processing circuit, an image signal processing circuit and the like as will be described later. The circuit portion 119 is constituted by layering the plural substrates. Parts which constitute each circuit are mounted on one or both sides of each substrate.

The two-dimensional type CCD 121 is electrically connected with the circuit portion 119 and aligned to receive the image from the reflecting mirror 117. The two-dimensional type CCD 121 has plural elements arranged in a two-dimensional matrix (usually effective numbers of the elements are 250k elements, if higher resolution is needed, effective numbers of the elements are larger than 400k elements). While CCD 121 is provided as a two-dimensional light-responsive device, other types of light-responsive devices are also suitable.

The optical reading apparatus 100 in this invention has an automatic diaphragm mechanism 123, combination lenses 125 and a filter 127 for eliminating useless light, such as ambient light between the reflecting mirror 117 and the two-dimensional type CCD 121. Regulating means comprises the automatic diaphragm mechanism 123, the combination lenses 125, the filter 127 and the like.

The automatic diaphragm mechanism 123 will now be explained. There are various kinds of recording media carrying optically readable information, such as the two-dimensional symbol. For instance, taking an example of calra code labels, it is to be noted that the reflection factor of the calra code labels has a variation due to the difference in color, material or due to a stain thereon. Since the optical reading apparatus 100 detects the information of the calra code from the difference in reflection factor between dark (black) blocks and light (white) blocks, an amplitude of the output signal from the two-dimensional type CCD 121 used in the optical reading apparatus 100 is small when the reflection factor is low. On the other hand, when reading the calra code printed on a high reflection factor label, the output signal exhibits large amplitude. In this way, the output signal level changes due to the difference in reflection factor of the calra code labels, and therefore, this can result in an unstable reading because it is difficult to shape the waveform of an electrical signal. Also, when a high-intensity external light is applied to the label, the output signal from the two-dimensional type CCD 121 can be saturated resulting in an unreadable condition. The automatic diaphragm mechanism 123 is provided to obviate the above described potential difficulties.

Figure 6:
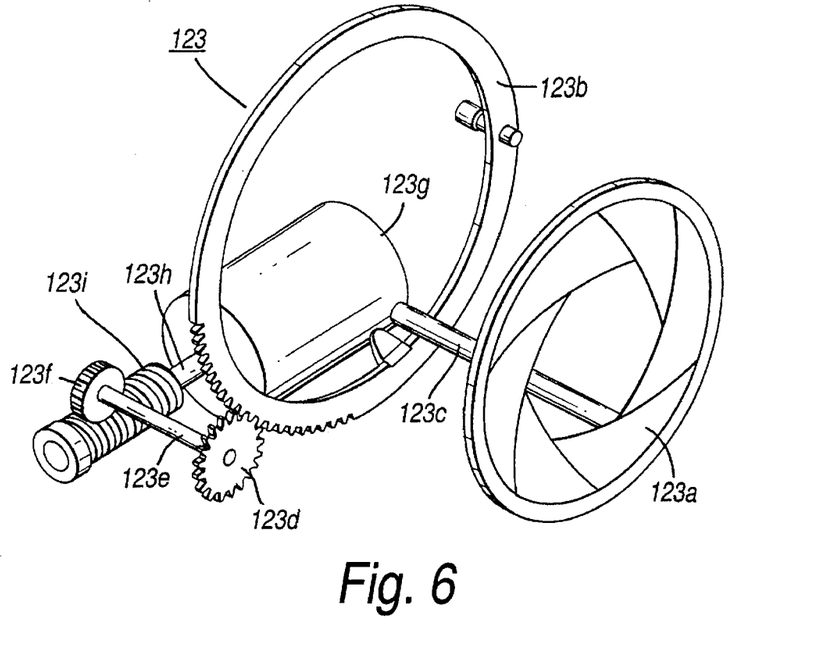
FIG. 6 is a perspective view of an automatic diaphragm mechanism of an embodiment of the present invention.

FIG. 6 is a perspective view of the automatic diaphragm mechanism 123. The automatic diaphragm mechanism 123 comprises a diaphragm member 123a, a control ring 123b, a connecting rod 123c, a first gear 123d, a first rotary shaft 123e, a second gear 123f, a motor 123g, a second rotary shaft 123h, and a worm gear 123i. The control ring 123b for controlling the diaphragm member 123a is connected with the diaphragm member 123a through the connecting rod 123c. The connecting rod 123c rotates to the right according to the control ring 123b rotating in the clockwise direction. Then an opening of diaphragm member 123a becomes wider. If the connecting rod 123c rotates in the anticlockwise direction, the opening of diaphragm member 123a becomes narrower.

The first gear 123d is engaged with teeth shaped on part of the control ring 123b. The first gear 123d is connected with second gear 123f through the first rotary shaft 123e. The second gear 123f is engaged with the worm gear 123i mounted on the second rotary shaft 123h driven by the motor 123g. Therefore, a rotational force generated by the motor 123g is transmitted to the control ring 123b through the second rotary shaft 123h, the worm gear 123i, the second gear 123f, the first rotary shaft 123e and the first gear 123d. The control ring 123b rotates in the clockwise direction or the anticlockwise direction in accordance with the rotating direction of the second rotary shaft 123h. The connecting rod 123c moves with the control ring 123b and, as a result, opening of the diaphragm member 123a is controlled in accordance with the moving of connecting rod 123c.

The combination lenses 125 are mounted to focus the image of the two-dimensional symbol on the two-dimensional type CCD 121 when the reading portion 105 is located within 0.5 inch of the recording media on which the two-dimensional symbol has been printed, for example a label. The combination lenses 125 also operate to regulate a distortion of the image. In this embodiment, the combination lenses 125 are used, but an aspherical lens can be used.

The movable switch 113 and the buzzer 129 are electrically connected with the circuit portion 119. The buzzer 129 is used to inform of an occurrence of an error or the completion of reading by changing a sound level or number of the generated sounds.

Figure 7:
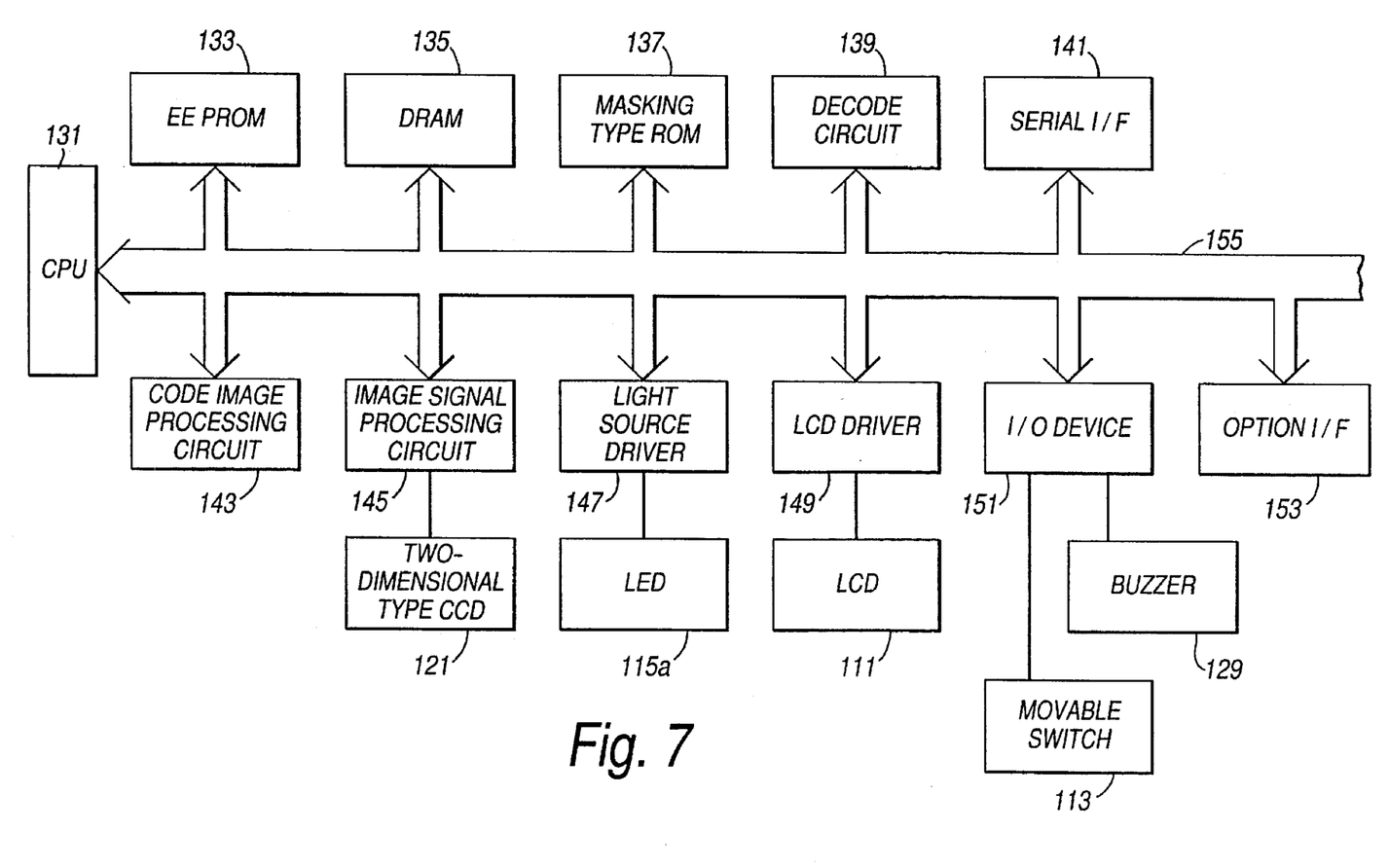
FIG. 7 is a block diagram relating to a circuit portion of the first embodiment of the optical reading apparatus of the present invention.

FIG. 7 is a block diagram relating to the circuit portion 119. The circuit portion 119 comprises a CPU 131, an EEPROM (Electrically Erasable Programmable Read Only Memory) 133, a DRAM 135, a masking type ROM 137, a decode circuit 139, a serial interface (serial I/F) 141, a code image processing circuit 143, an image signal processing circuit 145, a light source driver 147, an LCD driver 149, an input-output device (I/O device) 151 and an option interface (option I/F) 153. These circuit elements are connected to one another through bus line 155 consisting of an address bus, a data bus and a control bus.

The EEPROM 133 stores control programs for the CPU 131 and initial values. The DRAM 135 stores data inputted to the CPU 131 and outputted from the CPU 131. The masking type ROM 137 stores several data formats used to convert from image data to code data corresponding to the types of two-dimensional symbols. Therefore, this optical reading apparatus 100 may read the calra code and the two-dimensional bar code and the like. The decode circuit 139 converts from the image data to the code data in accordance with the format data. The decode circuit 139 is an IC of the gate array type. The serial I/F 141 performs a function for controlling the data communications between the optical reading apparatus 100 and an external apparatus, for example a host computer. The image signal processing circuit 145 performs a function of amplifying a signal from the two-dimensional type CCD 121 and controlling the two-dimensional type CCD 121. The light source driver 147 drives LEDs 115a. The LCD driver 149 performs a function of displaying an image on the LCD 111 in accordance with the image data from the code image processing circuit 143 and displaying messages which indicate an error state or a read complete state or the like in accordance with commands from the CPU 131. A signal from the movable switch 113 is inputted to the I/O device 151. A signal outputted to the buzzer 129 is outputted from the I/O device 151. The option I/F 153 performs a function of controlling the data communications by radio communications or optical communications, for example an infrared transmission or the like, between the optical reading apparatus 100 and an external apparatus.

The LCD/buzzer control circuit includes the LCD driver 149 and the I/O device 151. The main control circuit includes the CPU 131, EEPROM 133, DRAM 135 and serial I/F 141.

Figure 8A:
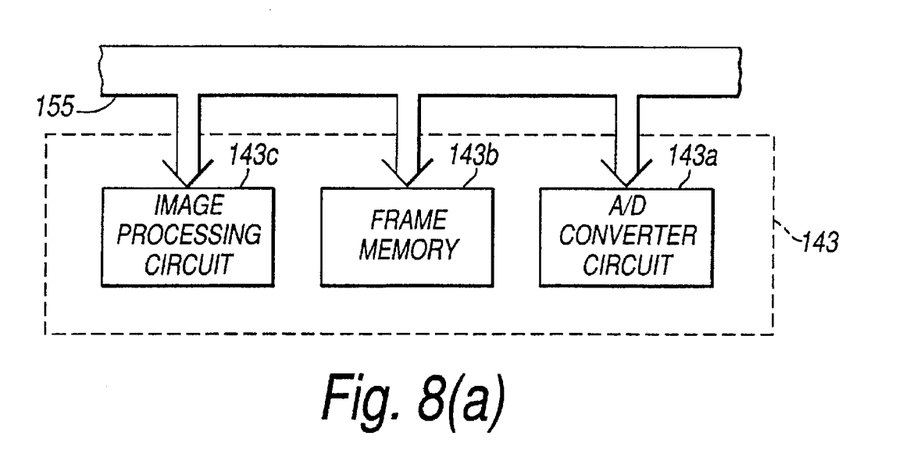

FIG. 8 (a) is a block diagram of the code image processing circuit 143. The code image processing circuit 143 comprises an analog-to-digital converter circuit (A/D converter circuit) 143a, a frame memory 143b and an image processing circuit 143c. These circuit elements are connected to one another through the bus line 155.

The A/D converter circuit 143a converts image signals from the image signal processing circuit 145 to digital signals. The frame memory 143b stores image data generated in accordance with the digital signals. The image data is generated by binarizing the digital signals in accordance with a predetermined threshold level. The image processing circuit 143c outputs the image data in the frame memory 143b to the LCD driver 149 to output the image data to the LCD 111. Further, when the image data which represents the two-dimensional symbol is stored in the frame memory 143b, the image processing circuit 143c reads the image data representing the two-dimensional symbol from the frame memory 143b and rotates the read image data to correct its two-dimensional orientation, if necessary. After correcting, image data representing the two-dimensional symbol is outputted to the DRAM 135.

Figure 8B:
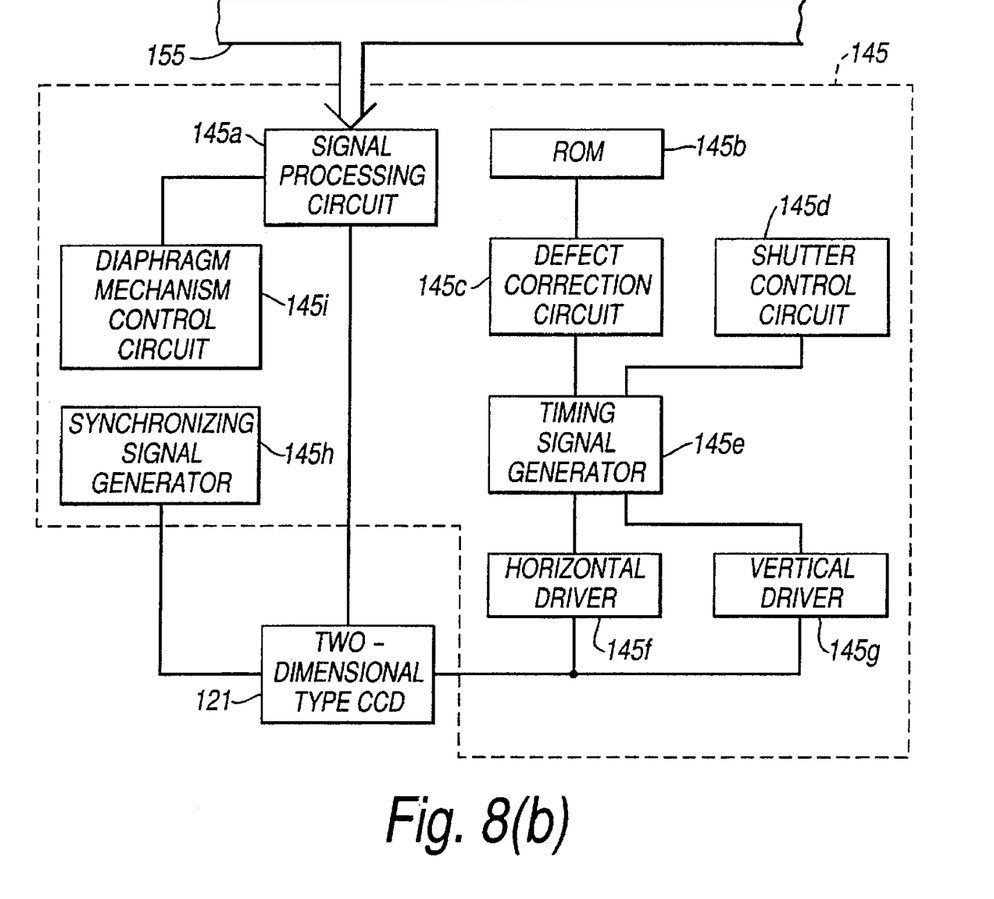

FIG. 8 (b) is a block diagram of the image signal processing circuit 145. The image signal processing circuit 145 comprises a signal processing circuit 145a, a ROM 145b, a defect correction circuit 145c, a shutter control circuit 145d, a timing signal generator 145e, a horizontal driver 145f, a vertical driver 145g, a synchronizing signal generator 145h and a diaphragm mechanism control circuit 145i. These circuit elements are electrically connected with one another.

The signal processing circuit 145a amplifies signals outputted from the two-dimensional type CCD 121. The ROM 145b stores defect data which indicates defects of the elements relating to the two-dimensional type CCD 121. Such defects of the elements are those resulting from the manufacturing process of the CCD. The defect correction circuit 145c performs a function of correcting a timing of the timing signal generated by the timing signal generator 145e. The shutter control circuit 145d controls an output time which the timing signal generator 145e outputs as a timing signal when the recording media on which the two-dimensional symbol is printed is moving. The timing signal generator 145e generates the timing signal in accordance with signals from the defect correction circuit 145c and the shutter control circuit 145d. The horizontal driver 145f and the vertical driver 145g designate the read element in accordance with the timing signal outputted from the timing signal generator 145e. The synchronizing signal generator controls a timing in accordance with which the outputting signal from the two-dimensional type CCD 121 is transmitted to the signal processing circuit 145a. The diaphragm mechanism control circuit 145i drives the motor 123g of the automatic diaphragm mechanism 123 to maximize the difference between a high level and a low level of the image signal outputted from the signal processing circuit 145a.

Figure 9:
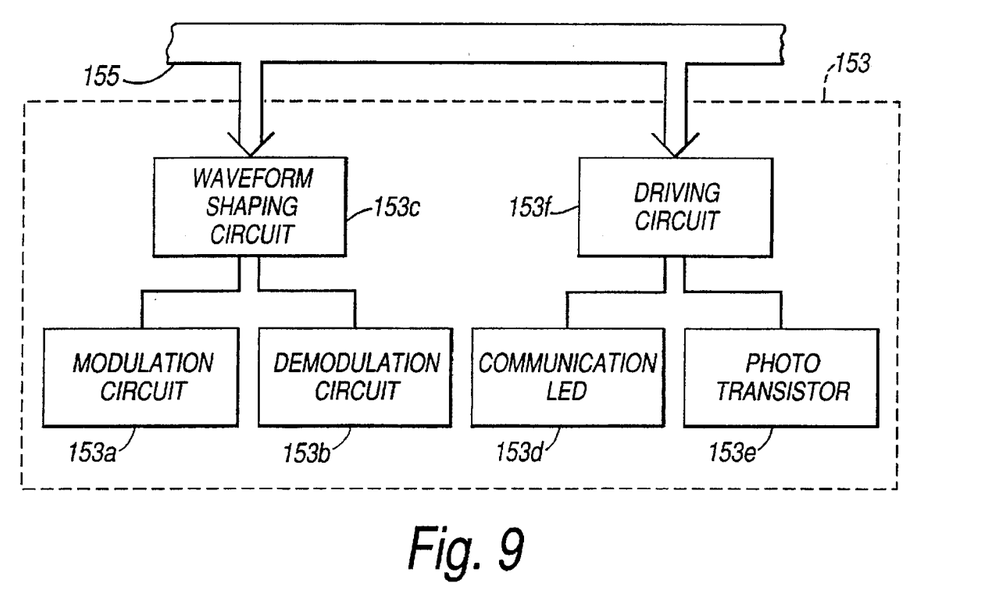
FIG. 9 is a block diagram of an option interface of the optical reading apparatus of an embodiment of the present invention.

FIG. 9 is a block diagram of the option I/F 153. The option I/F 153 comprises a modulation circuit 153a, a demodulation circuit 153b, a waveform shaping circuit 153c, a communication LED 153d, a photo transistor 153e and a driving circuit 153f.

The waveform shaping circuit 153c connects with the modulation circuit 153a for performing radio transmissions and the demodulation circuit 153b for performing radio receiving. The driving circuit 153f connects with the communication LED 153d for performing infrared transmissions and the photo transistor 153e for receiving infrared signals. The waveform shaping circuit 153c and the driving circuit 153f are connected with the bus line 155.

An image is always displayed by the LCD 111 without regard to operation of the movable switch 113. When the movable switch 113 is not in the on-state, the image signal processing circuit 145 amplifies the outputting signals outputted from the two-dimensional type CCD 121 and outputs the image signals to the code image processing circuit 143. The code image processing circuit 143 generates the image data in accordance with the image signals and outputs the image data to the LCD driver 149. Therefore, an image is displayed by the LCD 111. The automatic diaphragm mechanism 123 is also always activated.

Figure 10:
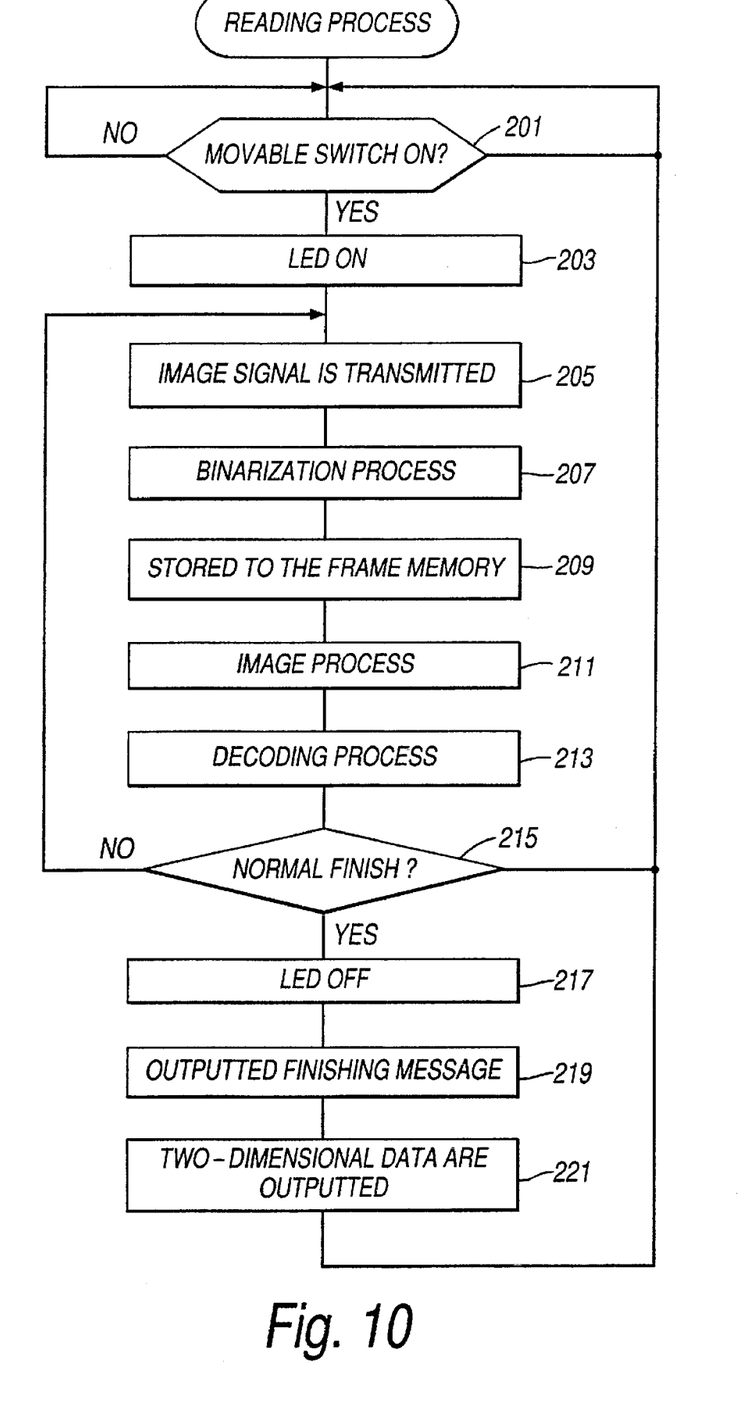
FIG. 10 is a flow chart showing a reading process of the optical reading apparatus of an embodiment of the present invention

FIG. 10 is a flow chart showing a reading processing of the optical reading apparatus 100. Whether or not the movable switch 113 is in the on-state is judged in step 201. This step is repeated if the movable switch 113 is not in the on-state. If the movable switch 113 is in the on-state, the YES-path is taken. When the YES-path is taken, the LEDs 115a are activated in step 203. The image signals outputted from the image signal processing circuit 145 are transmitted to the code image processing circuit 143 in step 205.

The automatic diaphragm mechanism 123 is controlled by the diaphragm mechanism control circuit 145i before the image signals is outputted from the image signal processing circuit 145. The operation of the diaphragm mechanism control circuit 145i is explained next. The signals outputted from the two-dimendional type CCD 121 are amplified by the signal processing circuit 145a and transmitted to the diaphragm mechanism control circuit 145i as image signals. The diaphragm member 123a of the automatic diaphragm mechanism 123 is controlled by the diaphragm mechanism control circuit 145i to maximize the difference between a high level and a low level of the image signals outputted from the signal processing circuit 145a. When the difference becomes maximized, then the image signals are outputted from the image signal processing circuit 145 to the code image processing circuit 143.

The image signals are binarized by the code image processing circuit 143 in step 207. The binarized data are transmitted to the frame memory 143b and stored in the frame memory 143b as the image data in step 209.

Step 211 is explained next. The image data stored in the frame memory 143b is displayed by the LCD 111. Further, whether or not image data includes the image data which indicates the two-dimensional symbol is judged. If the image data does not include the image data which indicates the two-dimensional symbol, the LCD 111 and the buzzer 129 are activated to inform the operator that an image of the two-dimensional symbol has not been obtained. When the image data includes the image data which indicates the two-dimensional symbol, image data which indicates the two-dimensional symbol is read, and, the read image data is rotated to correct its two-dimensional orientation. After correcting, the image data which indicates the two-dimensional symbol is stored in the DRAM 135.

The image data which indicates the two-dimensional symbol in the DRAM 135 is transmitted to the decode circuit 139 to be converted from the image data to two-dimensional code data in step 213. The decode process is explained next. The type of two-dimensional symbol which has been indicated as image data, for example the calra code or the two-dimensional bar code or the like, is judged. The format data are read from the masking type ROM 137 to determine a correspondence to the type of two-dimensional symbol being judged. The image data which indicates the two-dimensional symbol is converted to the two-dimensional code data in accordance with the format data read.

Whether or not the decode process is finished in the normal state is judged in step 215. If the decode process is finished in the normal state, i.e., without occurrence of problems, then the YES-path is taken. When the state is not normal (not can generate the two-dimensional code data), step 201 is executed again after outputting a message to the LCD 111 indicating a reading error. When the state is not normal (not can generate the two-dimensional code data), steps 205 to 215 may be executed a prescribed number of times, before outputting the message.

When the YES-path is taken, the LEDs 115a are turned off in step 217. A message which indicates that reading is finished is outputted to the LCD 111 or the buzzer 129 in step 219. The two-dimensional code data is transmitted to the external apparatus through the serial I/F 141 or the option I/F 153 in step 221. Step 201 is executed again after transmitting the two-dimensional code data.

The reading operation of the calra code shown in FIG. 1(c) by the optical reading apparatus 100 in this embodiment will be described next.

The operator operates the optical reading apparatus 100 by positioning the reading portion 105 within 0.5 inch of the label. Then, the operator may confirm the position of the calra code by the image displayed on the LCD 111. Therefore, the operator may locate the optical reading apparatus 100 to the best position with respect to the calra code. The LEDs 115a are activated in response to the operator operating the movable switch 113. Light generated from the LEDs 115a illuminates the bar code after being diffused. Reflected light from the calra code is reflected in the direction of the two-dimensional type CCD 121 by the reflecting mirror 117 and transmitted to the two-dimensional type CCD 121 through the filter 127, the combination lenses 125 and the automatic diaphragm mechanism 123. The useless light in the reflected light is eliminated by the filter 127. The image of the calra code is imaged by the combination lenses 125 on the two-dimensional type CCD 121.

The reflected light is converted to electrical signals by the elements of two-dimensional type CCD 121 in accordance with the quantity of light. The electrical signals are outputted to the image signal processing circuit 145 as output signals.

The output signals are amplified by the signal processing circuit 145a in the prescribed timing and outputted to the diaphragm mechanism control circuit 145i as image signals. The diaphragm mechanism control circuit 145i drives the motor 123g of the automatic diaphragm mechanism 123 to regulate the opening quantity of the diaphragm member 123a to maximize the difference between a high level and a low level of the image signals outputted from the signal processing circuit 145a. Therefore, the quantity of the reflected light received by the two-dimensional type CCD 121 is regulated to the best quantity by the automatic diaphragm mechanism 123 in a short time. As a result, the level of the image signals outputted from the image signal processing circuit 145 become the most suitable level for binarization (the difference between a high level (indicating the white blocks) and a low level (indicating the black blocks) of the image signals is maximized). When the automatic diaphragm mechanism 123 is regulated to maximize the difference between a high level and a low level of the image signals, then the image signals are outputted from the image signal processing circuit 145 to the code image processing circuit 143.

The code image processing circuit 143 converts the image signals to the image data which includes the image data which indicates calra code. The generated image data is stored in the frame memory 143b and transferred to the LCD driver 149 to display at the LCD 111. The code image processing circuit 143 reads the image data which indicates the calra code from the frame memory 143b and rotates the read image data to correct the orientation. After correcting, image data which indicates the calra code is stored in the DRAM 135.

The image data which indicates the calra code in the DRAM 135 is decoded to two-dimensional code data which has been indicated as the calra code in accordance with the format data stored in the masking type ROM 137 corresponding to the calra code by the decode circuit 139. The generated two-dimensional code data which has been indicated as the calra code is transmitted to the external apparatus through the serial I/F 141 or the option I/F 153.

Figure 11A:
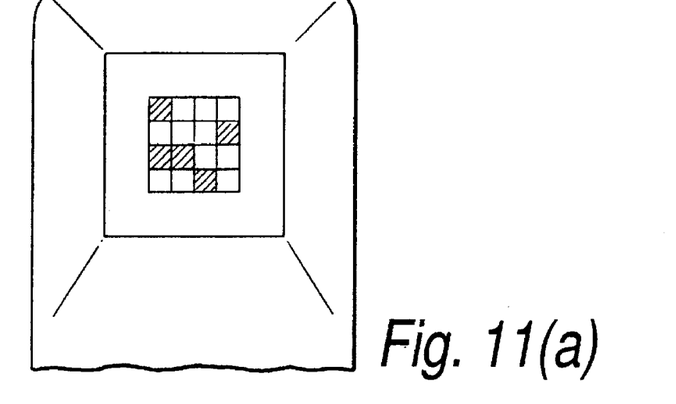
FIGS. 11a, 11b, and 11c are display views showing an image at an LCD or a window portion of an embodiment of the optical reading apparatus of the present invention.

FIG. 11 is a display view showing an image of calra code as shown in FIG. 1 (c) on the LCD 111. When the operator operates the optical reading apparatus 100 at a correct position relative to the calra code, the image of the calra code is displayed in the middle of the LCD 111 as shown in FIG. 11(a). The operator may recognize that the optical reading apparatus 100 is located in the correct position relative to the calra code.

Figure 11B:
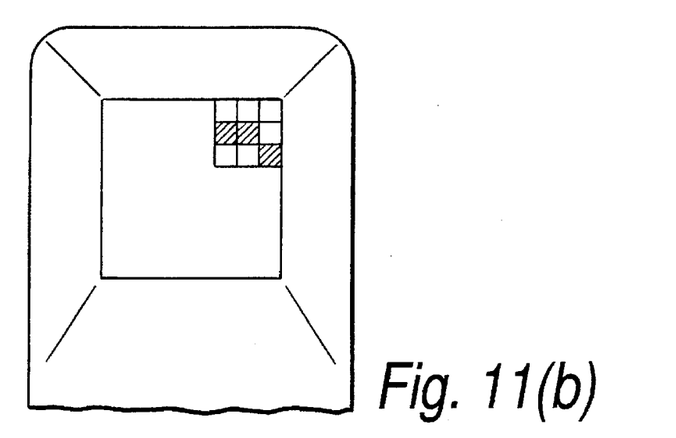

When the operator operates the optical reading apparatus 100 out of position from the correct position relative to the calra code, the image of the calra code is displayed on the LCD 111 as shown in FIG. 11(b). Only part of the image of the calra code is displayed by the LCD 111. The operator may recognize that the optical reading apparatus 100 is located out of position from the correct position relative to the calra code. Therefore, the operator can relocate the optical reading apparatus 100 to the correct position by guidance from seeing the image of the calra code on LCD 111. When the image of the calra code is displayed in the middle of the LCD 111, the optical reading apparatus 100 may certainly read the two-dimensional code data by operating the movable switch 113.

Figure 11C:
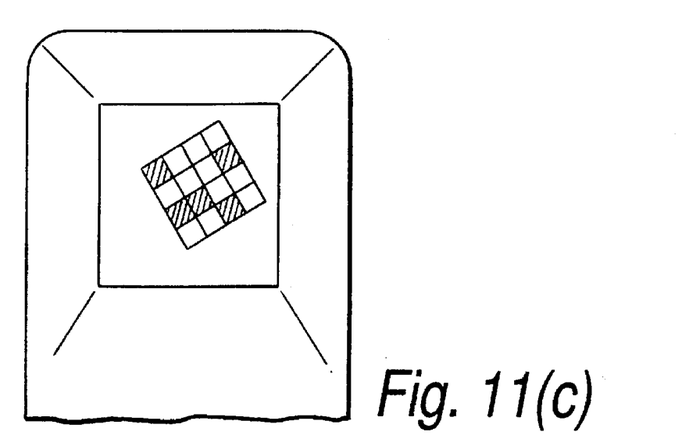

When the operator locates the optical reading apparatus 100 to a skewed position relative to the calra code, the image of the calra code is displayed on the LCD 111 as shown in FIG. 11(c). The operator may recognize that the optical reading apparatus 100 is located in a skewed position relative to the calra code. Therefore, the operator may surely relocate the optical reading apparatus 100 to the correct position by guidance from seeing the image of the calra code on LCD 111.

A second embodiment of the present invention will now be described with reference to FIGS. 12 to 14. The optical reading apparatus 100 indicated in the first embodiment includes the LCD 111 and the LCD driver 149 to display an image of the two-dimensional symbol read by the optical reading apparatus 100. However, the optical reading apparatus 300 indicated in the second embodiment does not include such a feature. Before the description proceeds, it is noted that like parts are designated by like reference numerals throughout the accompanying drawings, and therefore the detailed description thereof are not repeated.

Figure 12:
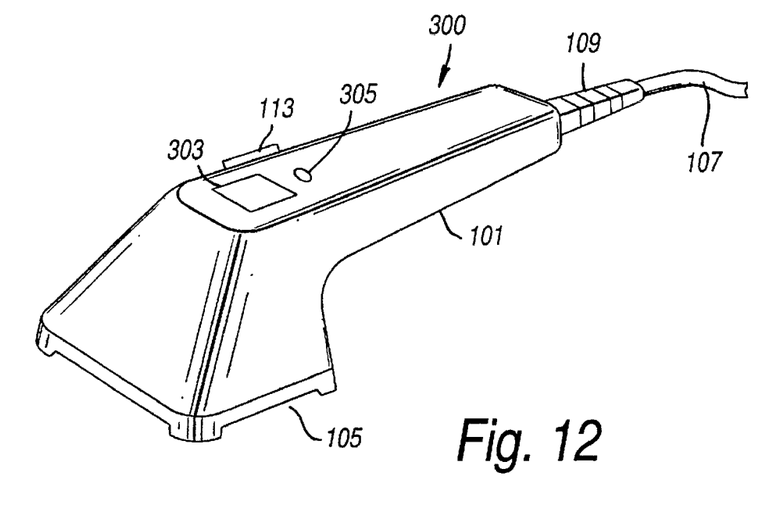
FIG. 12 is a perspective view of an optical reading apparatus of a second embodiment of the present invention.
Figure 13:
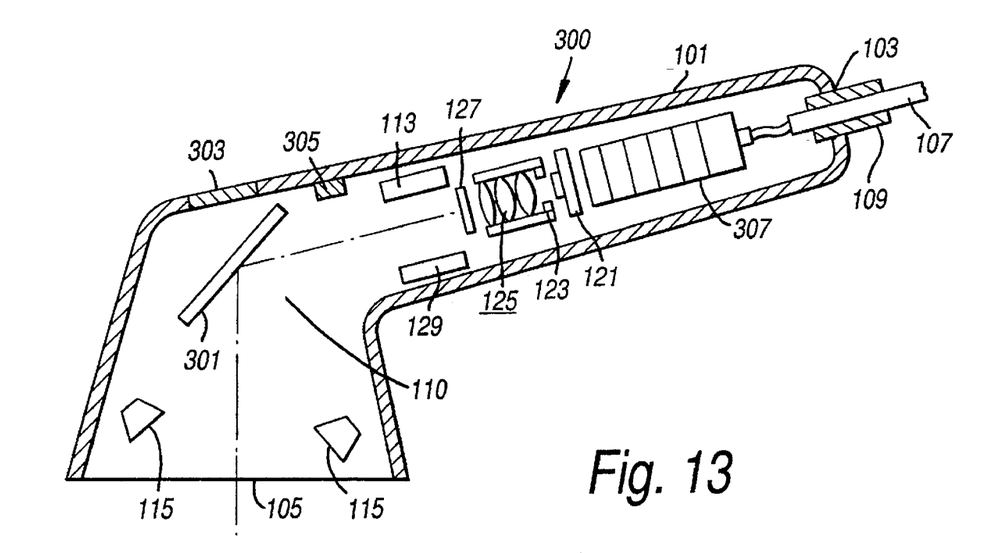
FIG. 13 is a sectional view of the optical reading apparatus of the second embodiment of the present invention.

FIG. 12 is a perspective view of an optical reading apparatus 300 of a second embodiment of a present invention. FIG. 13 is a sectional view of the optical reading apparatus 300 of the second embodiment of the present invention. The optical reading apparatus 300 comprises a housing 101, a hole 103, an opening 105, a wire cable 107, a protection member 109, a movable switch 113, light sources 115, a two-dimensional type CCD 121, an automatic diaphragm mechanism 123, combination lenses 125, a filter 127, a buzzer 129, a reflecting semi-transmissive mirror 301, a window portion 303, an information LED 305 and a circuit portion 307.

The reflecting semi-transmissive mirror 301 reflects a part of reflecting light from a two-dimensional symbol toward the two-dimensional type CCD 121. The reflecting semi-transmissive mirror 301 is mounted in a bend portion at a prescribed angle relative to a direction of the reading portion 105. The reflecting semi-transmissive mirror 301 transmits the other part of incident light from the two-dimensional symbol.

The window potion 303 is provided as a clear glass or clear plastic window and is mounted in a position to intercept the light which is transmitted through reflecting semi-transmissive mirror 301.

The information LED 305 is used to inform the operation of an error or that reading is complete.

Figure 14:
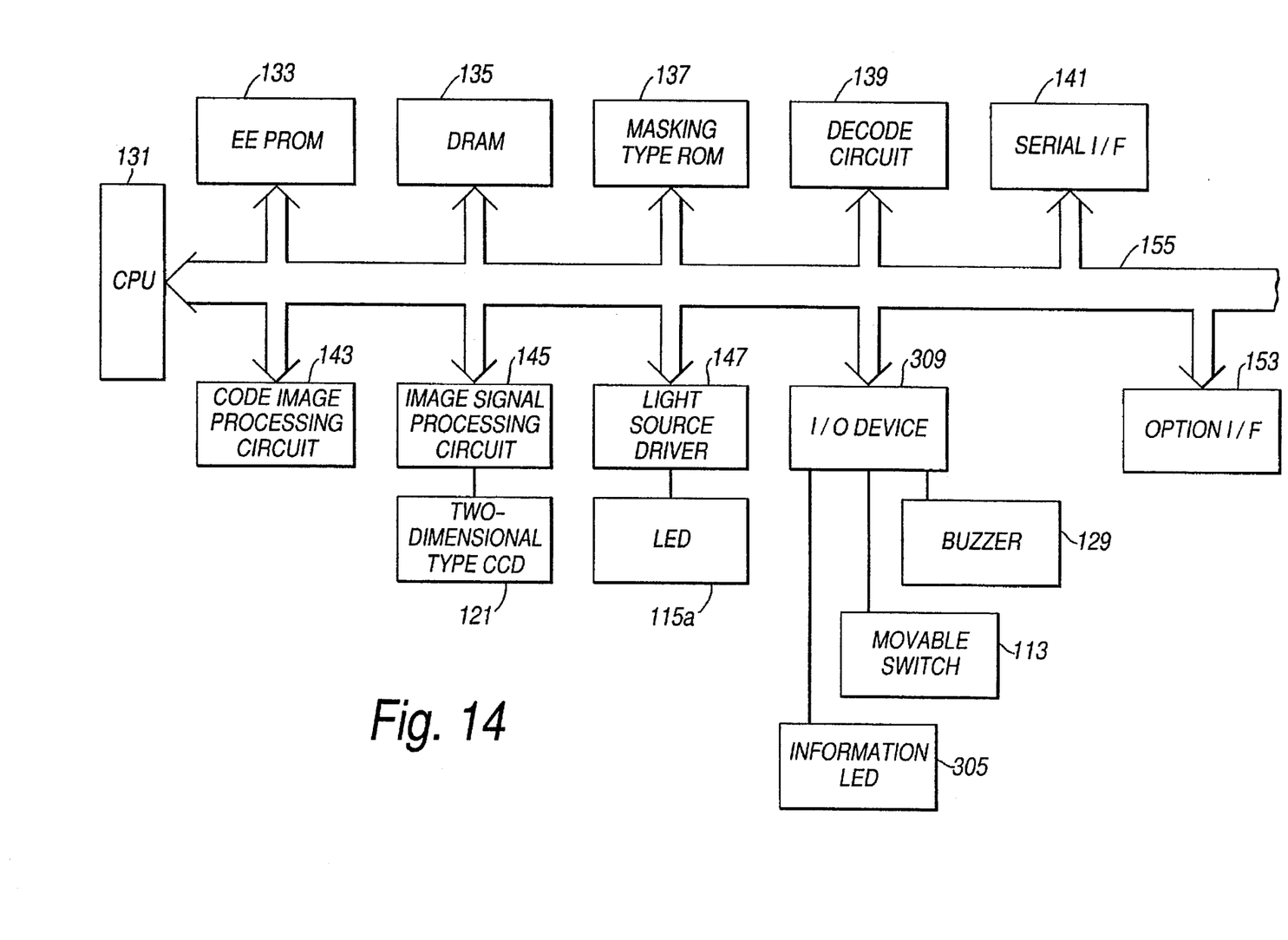
FIG. 14 is a block diagram relating to a circuit portion of the second embodiment of the optical reading apparatus of the present invention.

FIG. 14 is a block diagram relating to the circuit portion 307. The circuit portion 307 comprises a CPU 131, an EEPROM (Electrically Erasable Programmable Read only Memory) 133, a DRAM 135, a masking type ROM 137, a decode circuit 139, a serial interface (serial I/F) 141, a code image processing circuit 143, an image signal processing circuit 145, a light source driver 147, an input-output device (I/O device) 309 and an option interface (option I/F) 153. These circuit elements are connected to one another through bus line 155 which includes an address bus, a data bus and a control bus. A signal from the movable switch 113 is inputted to the I/O device 309. A signal outputted to the buzzer 129 and the information LED 305 are outputted from the I/O device 309.

Operation of the optical reading apparatus 300 in the second embodiment is explained next.

When the operator operates the optical reading apparatus 300 at a correct position against the calra code, the calra code is displayed in the middle of the window portion 303. Based on the display, the operator may recognize whether the optical reading apparatus 300 is located in the correct position relative to the calra code.

When the operator operates the optical reading apparatus 300 out of the position from the correct position relative to the calra code, only part of the calra code is displayed in the window portion 303. The operator may recognize that the optical reading apparatus 300 is located out of the position from the correct position relative to the calra code. Therefore, the operator may surely relocate the optical reading apparatus 300 to the correct position by guidance from seeing the image of the calra code through the window portion 303. When the calra code is displayed in the middle of the window portion 303, the optical reading apparatus 300 may certainly read the two-dimensional code data as calra code by operating the movable switch 113.

When the operator locates the optical reading apparatus 300 to a skewed position relative to the calra code, the display of the calra code in the window portion 303 is skewed. The operator may recognize that the optical reading apparatus 300 is located in a skewed position relative to the calra code. Therefore, the operator may surely relocate the optical reading apparatus 300 to the correct position by guidance from seeing the image of the calra code through the window portion 303.

Accordingly, optical reading apparatus as shown above, may read a two-dimensional symbols such as a calra code. Further, the apparatus is compact, so that operation is easy.

The present invention has been described with respect to a specific embodiment. However, other embodiments based on the principles of the present invention should be obvious to those of ordinary skill in the art. Such embodiments are intended to be covered by the claims.

What is claimed is:

1. An optical reading apparatus for reading a two-dimensional symbol, the apparatus including a housing having an opening portion for confronting the two-dimensional symbol and a gripping portion for holding by an operator, the apparatus comprising:

means, mounted near the opening portion, for generating light to illuminate the two-dimensional symbol through the opening portion;

means for directing the light reflected from the two-dimensional symbol toward the gripping portion;

a diaphragm for regulating the light directed from the directing means to provide regulated light;

means, responsive to the regulated light, for generating electrical signals, the generating means including a plurality of photosensitive elements; and means, in the housing, for converting the electrical signals into a two-dimensional code data;

wherein the diaphram has a variable size for variably regulating a quantity of light from the directing means in accordance with the electrical signals from the converting means to maximize a difference between a low level and a high level of image signals output by the converting means.

2. An apparatus as defined in claim 1, wherein the light generating means includes a diffusion lens.

3. An apparatus as defined in claim 1, wherein the directing means includes a reflecting mirror.

4. An apparatus as defined in claim 3, wherein the reflecting mirror is arranged to reflect the light reflected from the two-dimensional symbol at an angle larger than 90 degrees.

5. An apparatus as defined in claim 1, wherein the generating means includes a two-dimensional type CCD.

6. An apparatus as defined in claim 1, wherein the converting means includes means for providing an image data in accordance with the electrical signals from the generating means and means for providing the two-dimensional code data in accordance with the image data.

7. An apparatus as defined in claim 6, wherein the two-dimensional code data providing means includes means for storing format data corresponding to the type of two-dimensional symbol to generate the two-dimensional code data.

8. An apparatus as defined in claim 6, further including means for displaying a position of the two-dimensional symbol being read relative to the opening portion.

9. An apparatus as defined in claim 8, wherein the displaying means includes a display for displaying an image in accordance with the image data provided by the image data providing means.

10. An apparatus as defined in claim 9, wherein the display comprises a liquid crystal display.

11. An apparatus as defined in claim 1, further including means for displaying a position of the two-dimensional symbol being read relative to the opening portion.

12. An apparatus as defined in claim 11, wherein the directing means includes a reflecting semi-transmissive mirror for transmitting a part of light reflected from the two-dimensional symbol and a window portion for intercepting the light passing through the reflecting semi-transmissive mirror.

13. An apparatus as defined in claim 1, wherein the converting means is accommodated in the gripping portion of the housing.

14. An apparatus as defined in claim 1, wherein the plurality of photosensitive elements of the generating means are arranged in a two-dimensional form.

15. An apparatus as defined in claim 1, wherein the light sources of the light generating means include light emitting diodes.

16. An optical reading apparatus for reading a two-dimensional symbol, the apparatus including a housing having an opening portion for confronting the two-dimensional symbol, the apparatus comprising:

means, mounted near the opening portion, for generating light to illuminate the two-dimensional symbol through the opening portion;

a diaphragm for regulating the light reflected from the two-dimensional symbol to provide regulated light;

means, responsive to the regulated light, for generating electrical signals, the generating means including a plurality of photosensitive elements; and means, in the housing, for converting the electrical signals into a two-dimensional code data, the converting means including means for providing an image data in accordance with the electrical signals from the generating means and means for providing the two-dimensional code data in accordance with the image data;

wherein the diaphragm has a variable size for variably regulating a quantity of light from the directing means in accordance with electrical signals from the converting means to maximize a difference between a low level and a high level of image signals output by the converting means.

17. An apparatus as defined in claim 16, wherein the plurality of photosensitive elements of the generating means are arranged in a two-dimensional form.

18. An apparatus as defined in claim 16, wherein the light generating means includes a diffusion lens.

19. An apparatus as defined in claim 16, wherein the generating means includes a two-dimensional type CCD.

20. An apparatus as defined in claim 16, wherein the two-dimensional code data providing means includes means for storing format data corresponding to the type of two-dimensional symbol to generate the two-dimensional code data.

21. An apparatus as defined in claim 16, further including means for displaying a position of the two-dimensional symbol being read relative to the opening portion.

22. An apparatus as defined in claim 21, wherein the displaying means includes a display for displaying an image in accordance with the image data provided by the image data providing means.

23. An apparatus as defined in claim 22, wherein the display comprises a liquid crystal display.

24. An apparatus as defined in claim 21, wherein the directing means includes a reflecting semi-transmissive mirror for transmitting a part of light reflected from the two-dimensional symbol and a window portion for intercepting the light passing through the reflecting semi-transmissive mirror.

25. An apparatus as defined in claim 16, wherein the light sources of the light generating means include light emitting diodes.

26. An optical reading apparatus for reading a two-dimensional symbol, the apparatus including a housing having an opening portion for confronting the two-dimensional symbol and a gripping portion for holding by an operator, the apparatus comprising:

means, mounted near the opening portion, for generating light to illuminate the two-dimensional symbol through the opening portion, the light generating means including several light sources and diffusion lenses equally diffusing light from the light sources;

means for directing the light reflected from the two dimensional symbol toward the gripping portion;

a diaphragm for regulating the light directed from the directing means to provide regulated light;

means, responsive to the regulated light, for generating electrical signals, the generating means including a plurality of photosensitive elements; and means, in the housing, for converting the electrical signals into a two-dimensional code data;

wherein the diaphragm has a variable size for variably regulating quantity of light from the directing means in accordance with electrical signals from the converting means to maximize a difference between a low level and a high level of image signals output by the converting means.

27. An optical reading apparatus for reading a two-dimensional symbol, the apparatus including a housing having an opening portion for confronting the two-dimensional symbol, the apparatus comprising:

means, mounted near the opening portion, for generating light to illuminate the two-dimensional symbol through the opening portion, the light generating means including several light sources and diffusion lenses equally diffusing light from the light sources;

a diaphragm for regulating the light reflected from the two-dimensional symbol to provide regulated light;

means, responsive to the regulated light, for generating electrical signals, the generating means including a plurality of photosensitive elements; and means, in the housing, for converting the electrical signals into a two-dimensional code data, the converting means including means for providing an image data in accordance with the electrical signals from the generating means and means for providing the two-dimensional code data in accordance with the image data;

wherein the diaphragm has a variable size for variably regulating a quantity of light reflected from the two-dimensional symbol in accordance with electrical signals from the converting means to maximize a difference between a low level and a high level of image signals output by the converting means.

* * * * *